UNITED STATES PATENT OFFICE.

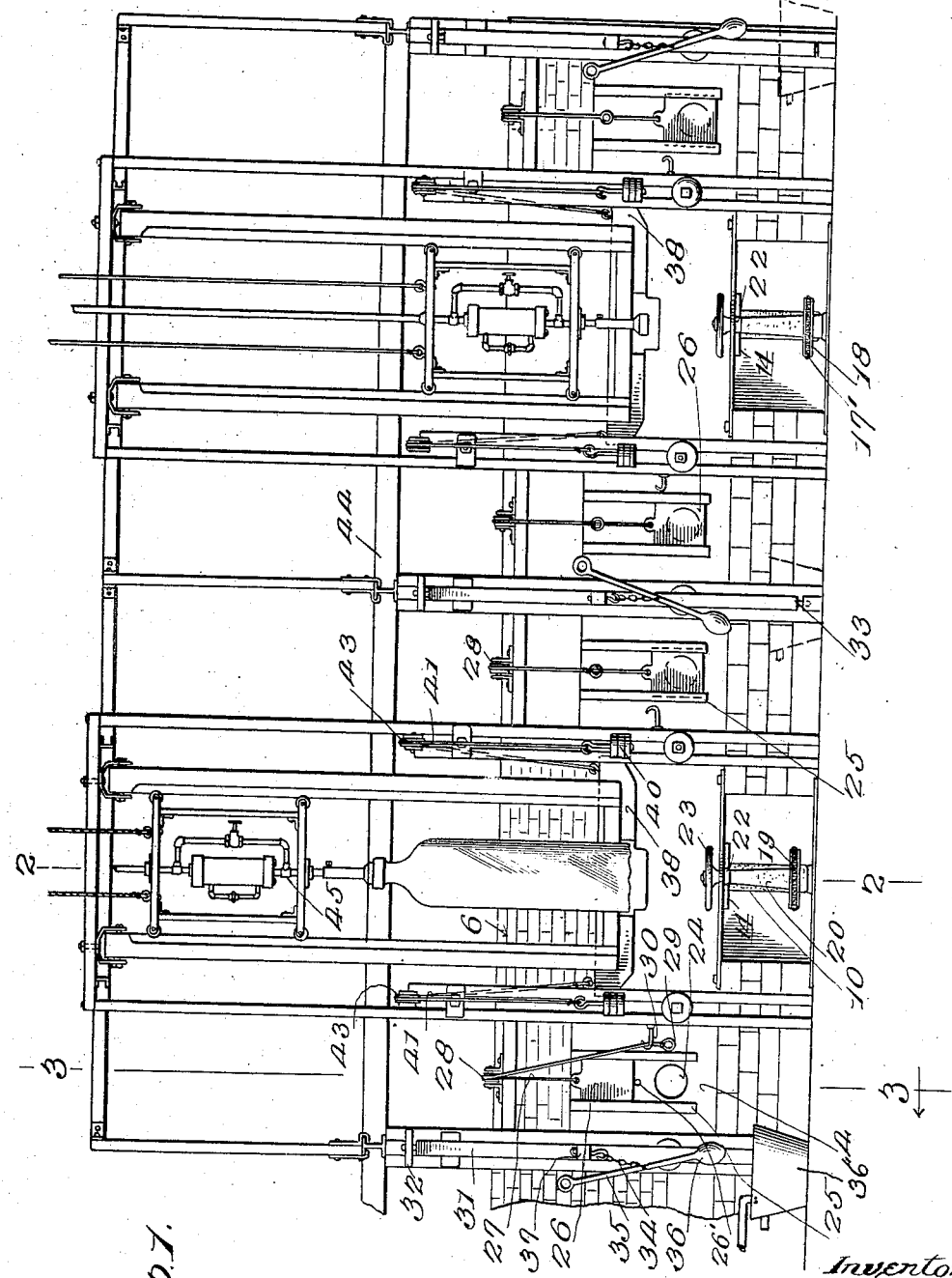

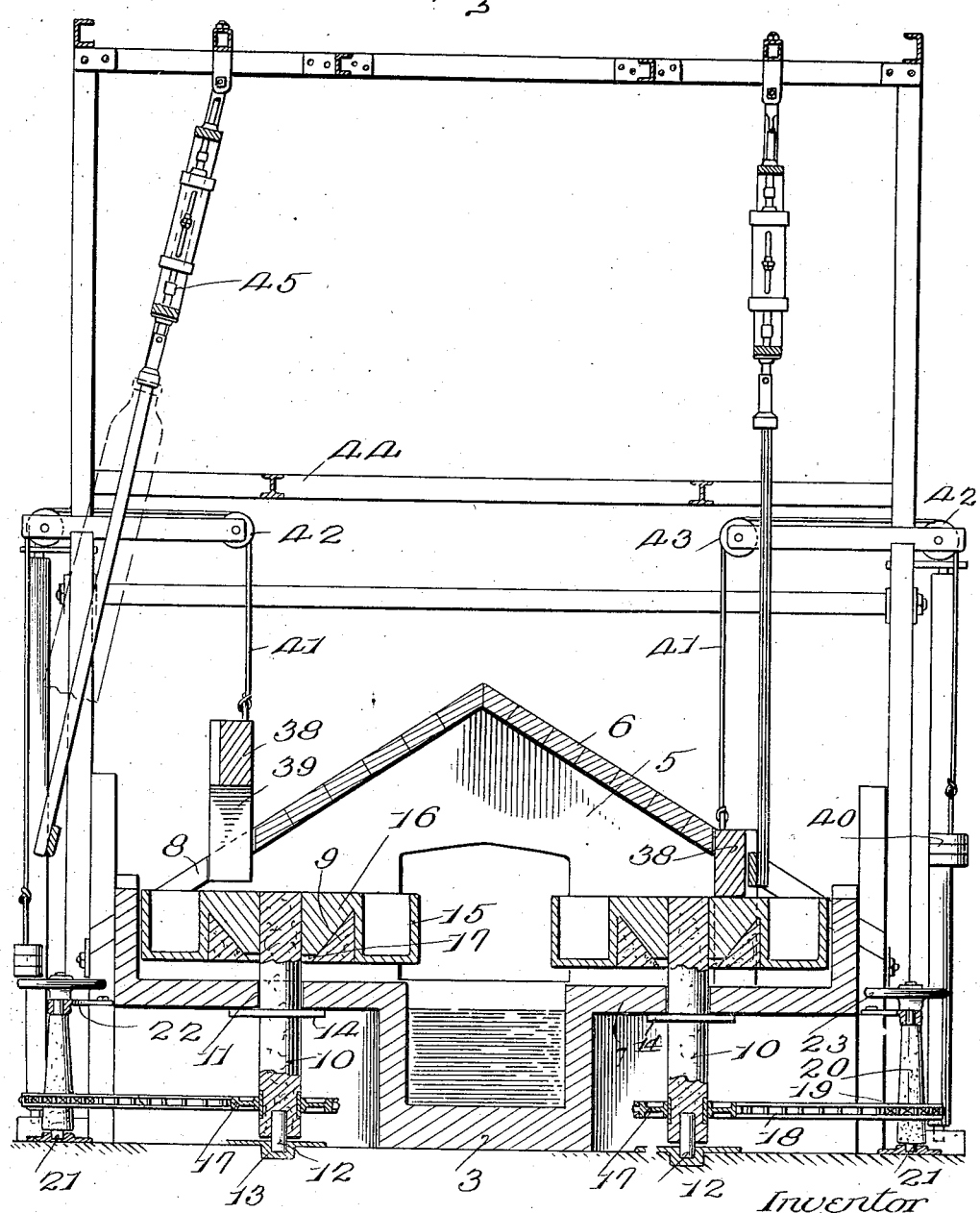

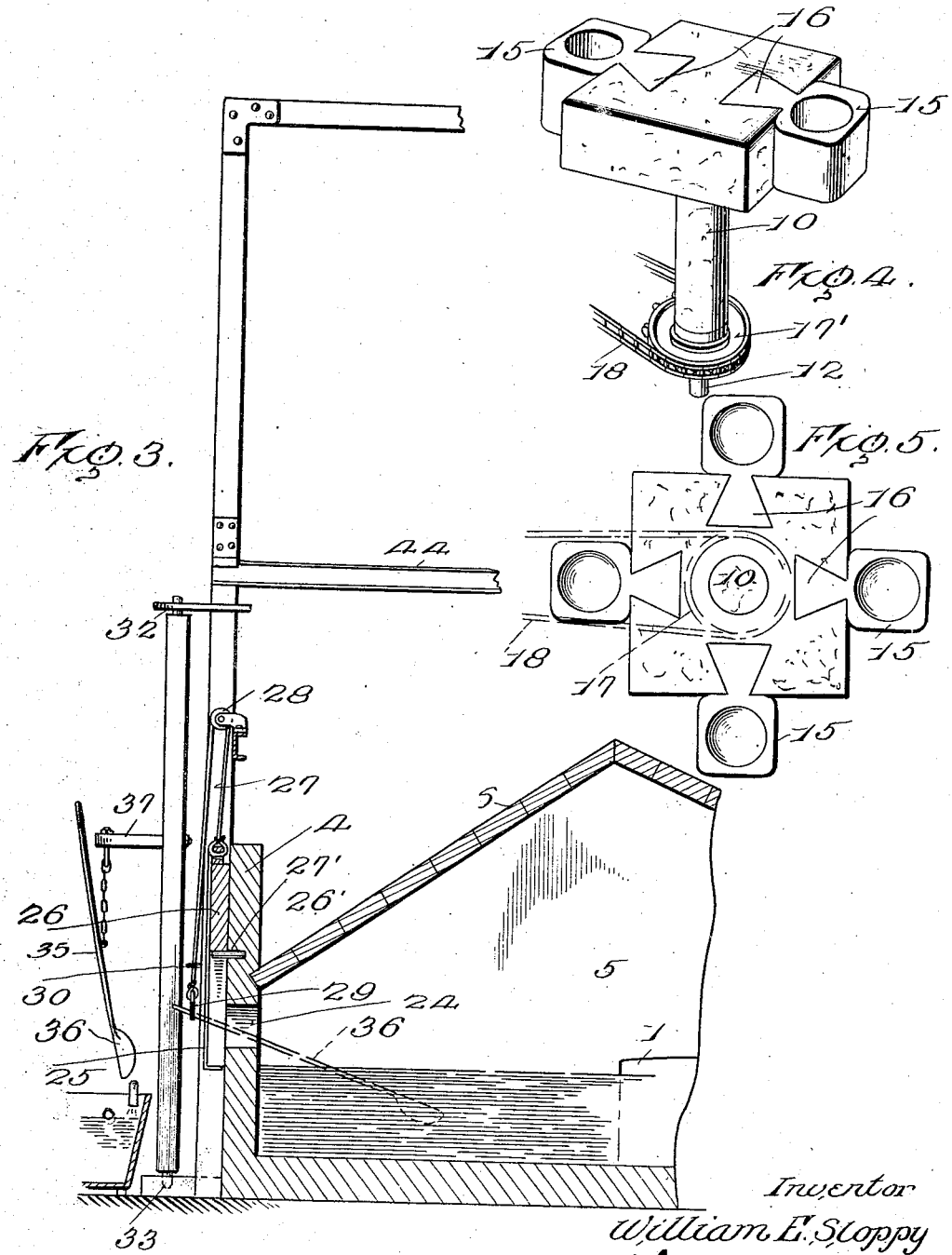

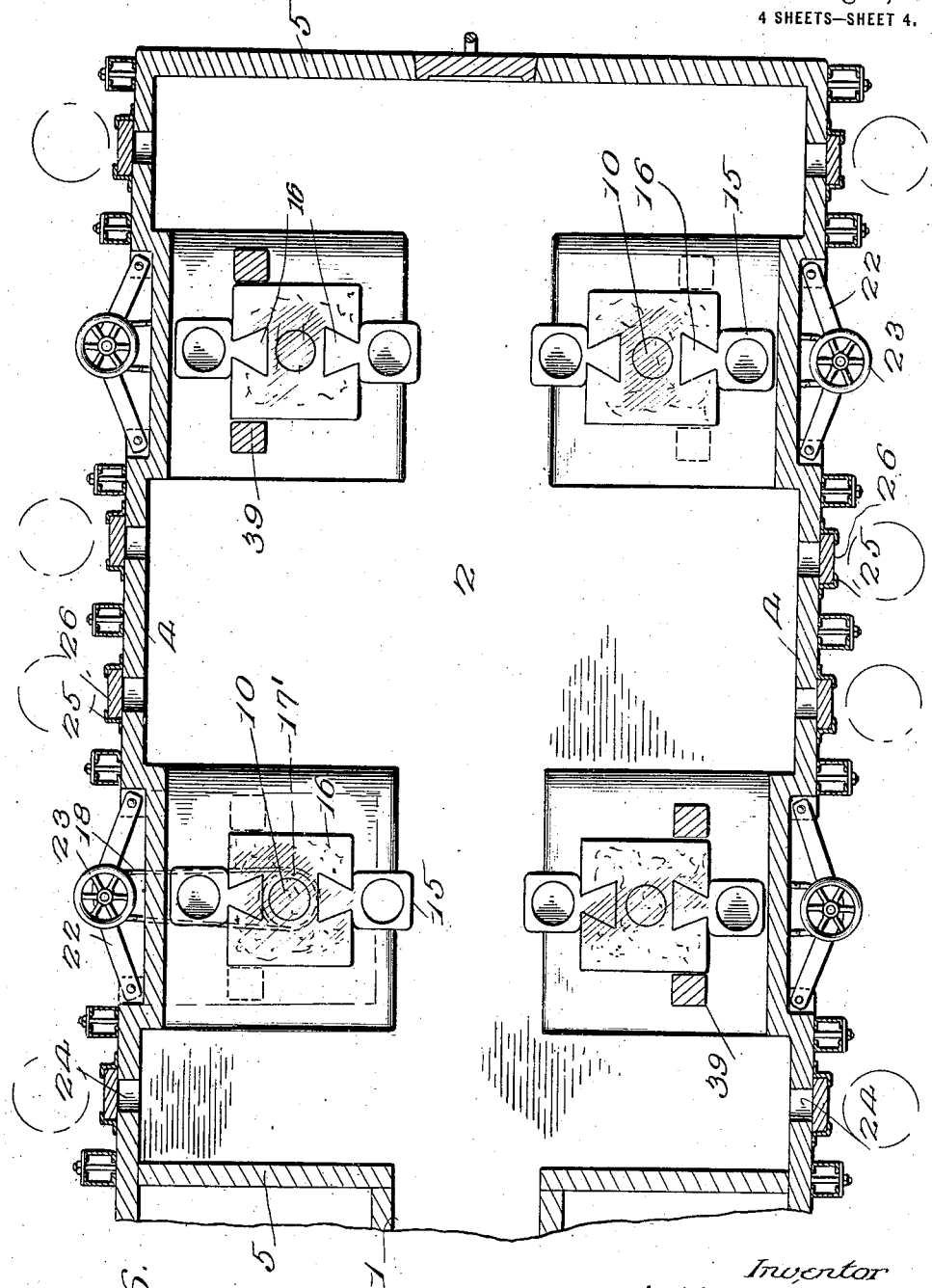

WILLIAM E. SLOPPY, OF MOUNT JEWETT, PENNSYLVANIA, ASSIGNOR OF FORTY-NINE ONE-HUNDREDTHS TO ORREN L. PARKHURST, OF KANE, PENNSYLVANIA.

GLASS APPARATUS.

1,274,616.  Specification of Letters Patent.  Patented Aug. 6, 1918.

Application filed June 12, 1917. Serial No. 174,323.

*To all whom it may concern:*

Be it known that I, WILLIAM E. SLOPPY, a citizen of the United States, residing at Mount Jewett, in the county of McKean and State of Pennsylvania, have invented certain new and useful Improvements in Glass Apparatus, of which the following is a specification.

This invention relates to glass apparatus, and more particularly to an apparatus for handling the molten glass just prior to the drawing operation. In one type of such apparatus the molten glass is conveyed from the melting furnace, in ladles or other receptacles, to heated pots from which the glass is drawn. Such an apparatus, of course, requires a conveyer system extending between the furnace and the drawing apparatus and not only is such a system expensive to install and maintain but the glass cools during transportation from the furnace to the drawing apparatus causing annoyance and interference with the drawing operation as well as occasional loss of time and material. In another type of apparatus the drawing apparatus is located at the furnace and the glass is drawn directly from a tank within the furnace. However, in this type of apparatus if a cylinder breaks, which not infrequently occurs, the cooled or chilled glass falls directly into the tank containing the molten glass and interferes with further drawing of the glass from the tank until the chilled glass has been skimmed from the tank or until the molten glass has been removed from the tank and remelted in the furnace. The present invention, therefore, has as its object to provide apparatus of the class mentioned which will possess none of the disadvantages attending the use of the two types of apparatus above briefly described and which will, on the other hand possess various new advantages and be in every way more efficient and capable of manipulation with a minimum expenditure of heating fuel and time and minimum waste of material through premature cooling or chilling, etc.

One aim of the present invention is to provide an apparatus of the class mentioned embodying a melting furnace and a tank for the molten glass, means whereby the drawing operation may take place at the tank and yet the glass will be drawn from only a relatively small quantity of the molten glass which is removed from the tank, instead of drawing directly from the tank itself. In this manner the chances of premature cooling or chilling of the glass are eliminated and should a cylinder break while being drawn, there will be no appreciable interruption in the drawing operation as the receptacle from which the cylinder is being drawn may be readily removed and replaced by another one. As only that quantity of the glass retained in the receptacle from which the cylinder is being drawn is affected by the breakage of the cylinder, obviously much less time is required to remelt this glass and the broken cylinder than is required in that type of apparatus wherein the glass is drawn directly from the tank.

Another aim of the invention is to provide for the conservation of heat in the operation of the apparatus so that not only will there be a saving in fuel but also air will be prevented from entering the tank of the furnace and chilling the glass contained therein.

In the accompanying drawings:

Figure 1 is a front elevation of the apparatus embodying the present invention;

Fig. 2 is a vertical sectional view on the line 2—2 of Fig. 1;

Fig. 3 is a similar view on the line 3—3 of Fig. 1;

Fig. 4 is a perspective view illustrating one of the rotary pot supports of the apparatus;

Fig. 5 is a plan view illustrating a modified form of such support;

Fig. 6 is a horizontal sectional view illustrating the pot supports in top plan.

In the drawings the numeral 1 indicates the overflow from the reducing chamber of a glass furnace and by way of this overflow the molten glass is permitted to flow from the said reducing chamber to the working chamber which is indicated in general by the numeral 2, the apparatus embodying the present invention being arranged within this latter chamber. The working chamber includes a floor 3, side walls 4, end walls 5, and a roof 6. The heat from the reducing chamber, of course, passes to the working chamber and maintains the molten glass contained therein at a constant and workable temperature. The apparatus embodying the present invention includes any desired number of tables which are rotatable and which support pots designed to receive the molten glass and in the arrangement shown in Figs. 1 and 6 of the drawings, four of these tables are provided, two being arranged beside each side wall 4. Inasmuch as these tables and their associated parts are of counterpart construction, a specific description of one will suffice for all. At the point of location of each table the floor of the working chamber is elevated, as at 7, and the roof of the said chamber above each elevated portion is provided with an opening 8. Each of said tables includes a body or head 9 which is preferably rectangular although it may be of any other suitable shape and this head is mounted and supported at the upper end of a shaft 10 which is rotatably fitted through an opening 11 formed in the raised portion 7 of the floor 3. The lower end of the shaft is provided with a journal 12 which is seated in a step bearing 13. A flange 14 is formed or provided upon the shaft 10 and bears at the under side of the raised portion 7 at the opening 11 so that in the operation of the shaft and table there will be no wabbling movement such as would be likely to cause spilling of the molten glass in the pots carried by said table. Each of the pots is indicated by the numeral 15 and each is formed at one side with a dove-tail boss 16 designed to be removably fitted in a similarly formed recess or socket 17 in the head 9. In that form of the invention shown more specifically in Fig. 4 of the drawings, the table is provided in two of its opposite sides with recesses to receive the bosses 16 of two pots so that this table is designed to support two of the pots thereby adapting one pot to be filled with molten glass while the glass is drawn from the other pot. However, in that form of the invention shown in Fig. 5 of the drawings one of the recesses 17 is formed in each side of the body 9. At this point it may be stated that all parts of the apparatus which are subjected to intense heat are formed of fire clay or some other refractory material, including the shafts 10. In order that the shafts may be rotated so as to properly position the pots for filling and drawing, a sprocket gear 17' is secured in any suitable manner upon each shaft near the lower end thereof and trained about this sprocket gear is a sprocket chain 18 which is also trained about a sprocket gear 19 fixed upon a rotatable post 20 mounted at its lower end in a step bearing 21 and near its upper end in a bracket 22 upon the side wall of the working chamber and located exteriorly of said chamber. A hand wheel 23 is fixed upon the upper end of the post and by grasping this wheel and rotating the same, rotary motion may be imparted to the shaft 10. The head 9 of each table rotates above the elevation 7 in the floor of the working chamber and in spaced relation to said elevation so that the heated air currents within the working chamber may circulate around all sides of the pots 15 and thus maintain the molten glass contained therein at a working temperature. It will be observed particularly by reference to Fig. 2 of the drawings that the lower portion of the shaft 10 is housed beneath the elevation in the floor of the working chamber so that the said lower portion of the shaft, the sprocket gearing, and post 20, are not subjected to any considerable heat. In the rotation of the table the pots 15 are brought successively to position opposite the opening 8 in the roof of the working chamber. At the opposite sides of the opening 8, the side wall 4 of the working chamber is provided with openings indicated by the numeral 24 and fixed upon the outer face of the said side wall 4 at opposite sides of each opening 24 are guides 25 slidably receiving the lateral edges of a door 26 which may be slid into and out of position to cover or close the respective opening 24. Connected to the upper side of the door 26 is a cable or other suitable flexible element 27 which is passed over a pulley 28 located above the guides 25. The free end of the cable 27 is provided with a hand ring 29 and the cable is preferably led through a hook 30 located at one side of the opening 24 whereby the said hand ring will be held from in front of the opening 24 and will therefore not become highly heated. Normally the door 26 tends to drop by gravity to the position shown at the right hand side of Fig. 1 in which position it will close the respective opening 24. When, however, molten glass is to be ladled into the pots 15, the flexible cable 27 may be grasped and the door thus slid to raised position shown at the left in Fig. 1 of the drawings in which position it may be held by means of a pin 26' removably fitted into a socket 27 in the said wall 4. An upright 31 is rotatably mounted at its upper and lower ends in bearings 32 and 33, respectively, one of these uprights being located immediately adjacent the openings 24. Each upright 31 has connected with it one end of a ladle suspending chain 34 and the other end of this chain is connected to the handle 35 of a ladle, the bowl of which is indicated by the numeral 36. The point of attachment of the chain 34 to the handle 35 is preferably substantially mid-way between the ends of the said handle and while the first-mentioned end of the chain may be disconnected from the upright 31 when the ladle is to be employed, the said end may, nevertheless, be allowed to remain connected with the upright and the chain thus serve somewhat as a fulcrum upon which the ladle may be turned so as to dip the molten glass from the mass in the working chamber and pour the same into the pot to be filled. In connecting chain 34 with the upright 31 it is preferable that the said chain be connected to an arm 37 which extends outwardly from the said upright.

In order to hold the table against rotation and, further, in order to substantially completely close the opening 8 and thereby exclude cold air from the working chamber, there is provided a block 38 which is mounted for vertical sliding movement in the said opening 8 and has its under side recessed so as to provide depending side portions 39, the block being designed to straddle the head 9 when the head is in position by one of the pots 8 supported thereby, located at the said opening 8. The block tends to lower by gravity but is counterbalanced by a pair of weights 40, a pair of cables 41 being connected to the upper corners of the block and to the said weights and being trained over pulleys 42 and 43 arranged within a suitable frame superstructure 44, in which structure is also mounted the drawing apparatus comprising the usual bait and means for raising and lowering the same. When the head 9 has been rotated so as to bring one of the pots 15 supported thereby into position opposite the opening 8, the workman will lift the forward stretch of the cable 41 allowing the block 38 to settle into position straddling the head 9 whereby cold air will be excluded from the working chamber and at the same time the head 9 will be held against further rotative movement during the drawing operation, which operation is proceeded with in the usual manner, the drawing apparatus being indicated in general by the numeral 45. As the drawing apparatus forms no part of the present invention it need not be specifically described.

From the foregoing description of the invention it will be understood that by the apparatus comprising the same, glass may be drawn conveniently and practically directly from the furnace thereby obviating the disadvantages presented by apparatuses such as heretofore briefly described. Furthermore, the operation of drawing the glass may be proceeded with in a more expeditious manner inasmuch as while one workman is performing the drawing operation proper, another workman may be ladling molten glass into the pot 15 which is idle during the drawing operation.

It is preferable that a tub or the like, indicated by the numeral 36' be placed beneath or adjacent each ladle and that means be provided for delivering water to the tub and conducting water therefrom so that the ladle may be cooled whenever desired.

Having thus described the invention, what is claimed as new is:

1. In apparatus of the class described, the combination with a furnace having a working chamber and a tank located therein, of a rotary support located within the chamber, pots carried thereby, a wall of the chamber having an opening opposite which the pots are to be brought through the rotation of said supports, and a member movable into position to close said opening in rear of the pot which is located at said opening and when in such position constituting also means for holding the rotary support against rotation.

2. In apparatus of the class described, the combination with a furnace having a working chamber and a tank located therein, of a rotary support located within the chamber, a wall of the chamber having an opening, pots mounted upon the sides of said support and arranged to be brought individually in juxta-position to said opening through rotation of said support, and a member adjustable with relation to said opening and arranged when in one position to straddle a portion of the support to restrain the same from rotary motion and constituting also, in said position, means for closing the opening in rear of the pot, and means for moving said member into and out of said position.

3. In apparatus of the class described, the combination with a furnace having a working chamber and a tank located therein, of a rotary support located within the chamber, and pots carried thereby in position above the surface of the molten glass in the said tank, a wall of the chamber having an opening opposite which the pots are to be brought through the rotation of said support, the said wall of the chamber having a ladle opening in juxta-position to the first-mentioned opening.

4. In apparatus of the class described, a glass furnace having a working chamber and a tank located therein, the floor of the working chamber being located above the said tank, a rotary post extending through the floor of the working chamber and provided at its upper end with a head, means upon the head for supporting pots to receive molten glass, a rotary shaft mounted exteriorly of the furnace and counter to the said post, operative gear connection between the shaft and the post below the floor of the working chamber, the said working chamber being provided in its wall with an opening opposite which the pots are to be brought through rotation of the post, and a manually operable element upon the shaft for rotating the latter, the said element being located adjacent the opening.

In testimony whereof I affix my signature.

WILLIAM E. SLOPPY. [L. S.]